July 27, 1965  A. H. ALEXANDER  3,196,549
SEGMENT TYPE LOCATING PIN
Filed Nov. 28, 1962

INVENTOR.
ARTHUR H. ALEXANDER
BY
Lockwood, Woodard, Smith & Waikart
Attorneys

United States Patent Office 3,196,549
Patented July 27, 1965

3,196,549
SEGMENT TYPE LOCATING PIN
Arthur H. Alexander, 6433 N. Oakland, Indianapolis, Ind.
Filed Nov. 28, 1962, Ser. No. 240,618
5 Claims. (Cl. 33—174)

This invention relates generally to locating means for a workpiece or the like and in particular to an improved locating pin for fixing the location or position of a workpiece in a jig or fixture.

In designing a machine tool, when the position which the workpiece must occupy in the jig or fixture has been determined, some means must be provided so that in actual use, all the workpieces can be rapidly and easily located in the design position. Locating means must be provided which will assure that every workpiece will occupy the same position in the tool so that when the machine operation is performed, the work will be identical.

Where external locators are used and where location of the workpiece is taken from more than one hole in the workpiece, the "flatting" principle is used. In such arrangements, conventionally, two locating pins are provided (while more than two pins could be utilized, location is seldom taken from more than two holes in the workpiece even though additional holes are present). One external locator pin is circular in cross-section, the other is "flatted." That is, the flatted pin is given a configuration, by grinding or otherwise providing four flat surfaces along the pin axis which meet in diametrically opposed apices and in which the two opposed pairs of flat surfaces are joined by curved portions. While these conventional "diamond" type or flatted pins have long been used in the environment described above, they suffer from the disadvantage that their relieved cross-section, brought about by flattening of the side faces, results in a decrease in strength. Such flatted pins or studs also, as conventionally formed, do not minimize the clearance between the pin and locating hole for a given tolerance in hole location.

It is a primary object of the present invention to provide a locating stud or pin having a cross-sectional configuration which provides maximum strength and minimizes the clearance between the locating hole and the pin for a given workpiece position tolerance.

This and other objects of the present invention will become apparent as the description proceeds with reference to the accompanying drawings in which.

Figure 1:
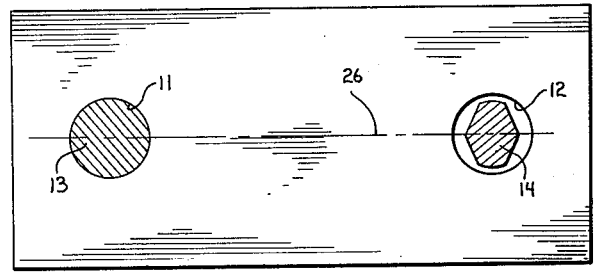
FIG. 1 is a top plan view of a workpiece whose position is taken from two holes in the workpiece, the locating pins being shown in cross-section.
Figure 2:
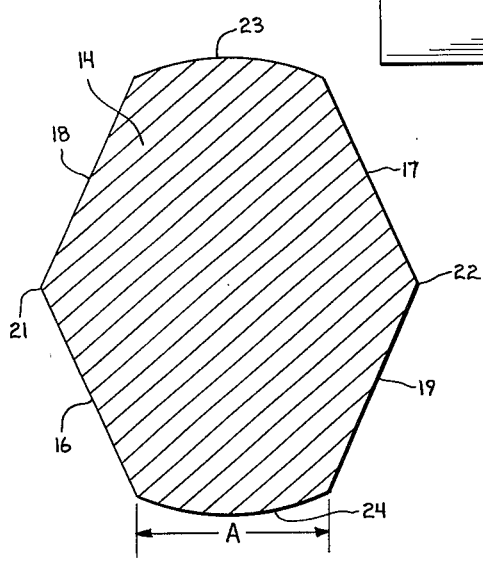
FIG. 2 is a transverse cross-section of a conventional flatted locating pin.
Figure 5:
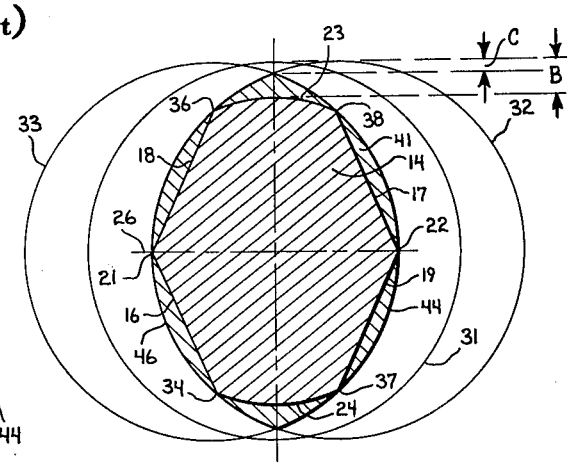
FIG. 5 is a schematic view showing the pin cross-sections of FIGS. 2 and 3 imposed upon each other.

Referring initially to FIGS. 1, 2, and 5, the utilization of a conventional, flatted locating pin will now be described. In FIG. 1 there is shown a workpiece whose position is to be taken from two circular apertures 11 and 12 in the workpiece. One external locating pin 13, circular in cross-section extends through the hole 11. The conventional flatted stud 14 has diametrically opposite flat surfaces 16, 17, 18 and 19 which join at apices 21 and 22. The adjacent outer ends of the flat surfaces are joined by a curved or arcuate surface 23 and 24.

In FIG. 1, as is conventional, the angular positioning of the flatted stud 14 is such that a center line running through the circular or arcuate portions 23 and 24 of the pin is at right angles to the common center line (identified at 26 in FIG. 1) between the holes 11 and 12. In this fashion accurate location of the workpiece 10 is obtained at right angles to the common center line 26, but variation in the center to center distance, that is, along the common center line 26 is permitted.

The cross-sectional proportions of the flatted stud or pin is determined by the tolerance permitted in the relative positioning of the holes 11 and 12 along their common center line 26. This will be evident from FIG. 5 wherein the circle identified at 31 represents the nominal position for the hole 12, the circle 32 represents the maximum allowable variation in the position of the hole along the center line 26 in one direction and the circle 33 represents the maximum allowable variation in the position of the hole 12 along the center line 26 in the opposite direction. The flat surfaces are formed on the pin so that the points 21, 34, and 36 associated with the surfaces 16 and 18 just engaged the inner margin of the aperture 12 when it is at one limit of its positional tolerance represented by the circle 32 in FIG. 5. On the opposite side of the pin the points 22, 37 and 38, associated with the surfaces 17 and 19, just engage the inner face of the hole 12 when it is at the opposite limit of its positional tolerance represented by the circle 33 of FIG. 5. The width (identified at "A" in FIG. 2) of the arcuate portions 24 and 23 is chosen so that the points 36–38 and 34–37 are adequately separated and the strength of the pin is not reduced by the reduction in pin cross-section necessitated by forming of the flatted surfaces. Conventionally, this dimension "A," identifying the width of the arcuate portions 24 and 23, is determined by rule of thumb as from ½ to ¼ of the distance between the points 21 and 22. It will be obvious that the width of the arcuate portions 23 and 24 if made relatively wide so as to provide maximum strength for the pin, the result will be a clearance dimension (identified at "B" in FIG. 5) which is relatively wide. Thus, if the pin is made relatively strong, accuracy in locating of the part itself must be sacrificed by the necessary presence of a relatively large clearance "B."

Figure 4:
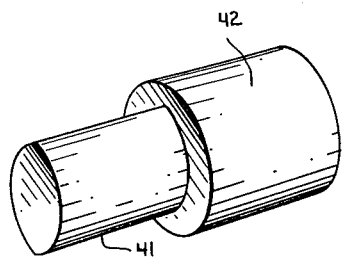
FIG. 4 is a perspective view of the pin cross-sectionally shown in FIG. 3.
Figure 3:
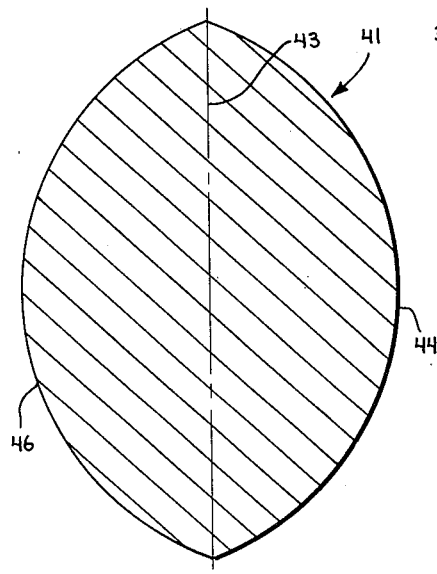
FIG. 3 is a transverse cross-sectional view of a locating pin embodying the present invention.

Referring to FIGS. 3, 4, and 5, the configuration of the locating pin of the present invention will now be described. As shown in FIG. 4 the pin may have a shank portion 41 which is adapted for insertion, for example, in the hole 12 in the workpiece 10 and may be further provided with a mounting portion such as the enlarged, circular in cross-section, portion identified at 42 in FIG. 4. The cross-section of the shank portion 41 of the pin is shown in FIG. 3 and takes the form of two circular segments having a common cord identified at 43 in FIG. 3. The arcuate portion of one circular segment is identified at 44 in FIG. 3 and the other at 46.

Referring to FIG. 5, the cross-sectional configuration of the pin of the present invention is formed so that the arcuate boundary 44 of one circular segment coincides with a portion of the circle 33 which represents one positional limit of hole 12 along the center line 26. The arcuate boundary 46 of the other circular segment coincides with a portion of the circle 32 which represents the opposite tolerable limit of the position of the hole 12 along the center line 26. As will be evident from FIG. 5, a comparison of the conventional pin 14 and the pin 41 of the present invention shows that the pin of the present invention engages the margin of the hole over an extended arc as compared to the three point engagement of the conventional pin 14. Further, and most important, with the pin of the present invention the clearance, identified at "C" in FIG. 5 is greatly reduced as compared to clearance "B" of the prior art structure. That is, for a given tolerance in location of the hole 12 along the center line 26 the clearance or allowable variation in positioning of the workpiece 10 along a line generally transverse to the center line 26 is minimized. In addition to this minimizing of clearance, it will also be evident from FIG. 5 that the pin 42 embodying the present invention has a substantially larger cross-sectional area than the comparable conventional pin 14 and therefore has substantially increased strength.

While the surface of the pin 41 is shown in FIG. 4 as being linear throughout its length, it will be understood that the tip of the pin might of course be provided with a small lead angle or taper to facilitate entry of the pin into the hole 12. However, the surface might for certain specialized uses, be spherical or conical or the like longitudinally. While the pin of the present invention has been described in use with a circular pin 13 where location is to be taken from two holes or apertures in a workpiece, it will be understood that, instead of the aperture 11, the location might be taken from another reference surface, such as a side or end surface of the workpiece, in conjunction with the aperture 12 receiving the pin of the present invention. Such arrangements with regard to longitudinal configuration of the locating pin and a reference surface other than aperture 11 are all considered to be within the scope of the present invention.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

I claim:

1. A locating pin for locating a workpiece or the like in a jig or fixture where location is determined from at least two holes in the workpiece, said pin having a cross-sectional surface in a plane normal to the longitudinal axis of the pin which is formed by two circular segments having a common chord, the arcuate boundaries of said segments having their radial centers located on a line normal to and bisecting said common chord, said centers being separated by a distance equal to the allowed positional tolerance of the workpiece holes along their common center line.

2. A locating pin for locating a workpiece or the like in a jig or fixture where location is determined from at least two holes in the workpiece, said pin having a working surface defined by two circular segments having a common chord, the arcuate boundaries of said segments which form said working surface having their radial centers located on a line normal to and bisecting said common chord, said centers being separated by a distance equal to the allowed positional tolerance of the workpiece holes along their common center line.

3. A pin for gaging or locating insertion in an aperture in a workpiece which has the aperture spaced from a reference surface, said pin having a cross-sectional surface in a plane normal to the longitudinal axis of the pin which is formed by two circular segments having a common chord, the arcuate boundaries of said segments having their radial centers located on a line normal to and bisecting said common chord, said centers being separated by a distance equal to the allowed positional tolerance of the workpiece aperture with relation to the reference surface.

4. A locating pin for locating a workpiece or the like in a jig or fixture where location is determined from a locating hole and a reference surface, said pin having a cross-sectional configuration in a plane normal to the longitudinal axis of the pin defined by arcs of equal length and equal radii joined at their ends, the radial centers of said arcs being spaced from each other by a distance corresponding to the allowed positional tolerance of the workpiece hole with relation to the reference surface.

5. A pin for locating or gaging a workpiece or the like, said pin having a cross-sectional configuration in a plane normal to the longitudinal axis of the pin defined by arcs of equal length and equal radii joined at their ends, the radial centers of said arcs being spaced from each other by a distance corresponding to the relative positional tolerance of two points on said workpiece.

No references cited.

ISAAC LISANN, *Primary Examiner.*